United States Patent
Kordybach et al.

(10) Patent No.: US 10,051,532 B2
(45) Date of Patent: Aug. 14, 2018

(54) EVALUATING HANDOVER FAILURES

(75) Inventors: Krzysztof Kordybach, Pulawy (PL); Richard Waldhauser, Munich (DE); Bernhard Wegmann, Holzkirchen (DE); Ingo Viering, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/375,449

(22) PCT Filed: Jan. 30, 2012

(86) PCT No.: PCT/EP2012/051434
§ 371 (c)(1),
(2), (4) Date: Oct. 16, 2014

(87) PCT Pub. No.: WO2013/113357
PCT Pub. Date: Aug. 8, 2013

(65) Prior Publication Data
US 2015/0031363 A1     Jan. 29, 2015

(51) Int. Cl.
| | |
|---|---|
| *H04B 7/02* | (2018.01) |
| *H04L 1/02* | (2006.01) |
| *H04W 36/00* | (2009.01) |
| *H04W 24/04* | (2009.01) |

(52) U.S. Cl.
CPC ....... *H04W 36/0094* (2013.01); *H04W 24/04* (2013.01); *H04W 36/0083* (2013.01)

(58) Field of Classification Search
CPC ............. H04W 36/0094; H04W 24/04; H04W 36/0083
USPC ....................................................... 455/436
See application file for complete search history.

(56) References Cited

U.S. PATENT DOCUMENTS

| | | | | |
|---|---|---|---|---|
| 2008/0273503 | A1* | 11/2008 | Lee | H04W 36/0055 370/336 |
| 2010/0113019 | A1 | 5/2010 | Jeong et al. | 455/435.2 |
| 2010/0124172 | A1 | 5/2010 | Tenny et al. | 370/242 |
| 2010/0173626 | A1 | 7/2010 | Catovic et al. | 455/423 |

(Continued)

FOREIGN PATENT DOCUMENTS

| | | | |
|---|---|---|---|
| EP | 2 291 028 A1 | 3/2011 | |
| EP | 2 765 805 A1 | 11/2012 | |
| EP | 2765805 A1 * | 8/2014 | ............ H04W 24/04 |

OTHER PUBLICATIONS

Nokia Siemens Networks et. al. "Correction of the MRO definitions" 3GPP Draft; R3-113015 MRO_DEFINITIONS_R10, 3rd Generation Partnership Project (3GPP), Mobile Competence Centre; 650, Route Des Lucioles; F-06921 Sophia-Antipolis Cedex; France; vol. RAN WG3, No. San Francisco, USA; Nov. 14, 2011-Nov. 18, 2011, Nov. 4, 2011.*

(Continued)

*Primary Examiner* — Tanmay Shah
(74) *Attorney, Agent, or Firm* — Harrington & Smith

(57) ABSTRACT

Apparatuses and methods are provided by which a user equipment receives information enabling handover and/or apparatus type identification related to a handover, and stores the information enabling handover and/or apparatus type identification. In case of a connection failure, the stored information enabling handover and/or apparatus type identification may later be used to evaluate the cause for the connection failure.

20 Claims, 4 Drawing Sheets

(56) References Cited

U.S. PATENT DOCUMENTS

| | | | |
|---|---|---|---|
| 2011/0044285 A1* | 2/2011 | Jang | H04W 36/02 370/331 |
| 2011/0207452 A1* | 8/2011 | Grob-Lipski | H04W 36/0033 455/423 |
| 2014/0050197 A1* | 2/2014 | Legg | H04W 76/028 370/331 |
| 2014/0148174 A1* | 5/2014 | Teyeb | H04W 36/0083 455/441 |
| 2014/0206360 A1* | 7/2014 | Wegmann | H04W 24/04 455/440 |

OTHER PUBLICATIONS

3GPP TSG-RAN WG3 Meeting #74, San Francisco, USA, Nov. 14-18, 2011, R3-113015, Correction of the MRO definitions:, Nokia Siemens Networks, Huawei, Alcatel-Lucent, ZTE, 4 pgs.

Nokia Siemens Networks Oy; "Performing Mobility Load Balancing and Mobility Robustness Optimization Between Access"; U.S. Appl. No. 61/559,275, filed Nov. 14, 2011.

Huawei; "MRO MLB interaction"; R3-112772; 3GPP TSG-RAN WG3 Meeting #74; San Francisco, USA, Nov. 14-18, 2011; whole document (2 pages).

Nokia Siemens Networks; "QoS awareness for MRO to allow higher MLB gain"; R3-113011; 3GPP TSG RAN WG3 Meeting #74; San Francisco, USA, Nov. 14-18, 2011; whole document (2 pages).

China Unicom; "Consideration on MRO&MLB Coordination in Inter-layer/RAT Networks"; R3-112828; 3GPP TSG-RAN WG3 Meeting #74; San Francisco, US, Nov. 14-18, 2011; whole document (3 pages).

Ericsson; "Analysis and support of enhanced mobility in HetNet deployments"; R3-112989; 3GPP TSG-RAN WG3 #74; San Francisco, USA, Nov. 14-18, 2011; whole document (6 pages).

* cited by examiner

EVALUATING HANDOVER FAILURES

FIELD OF THE INVENTION

The present invention relates to apparatuses, methods and a computer program product for improving evaluations of handover failures, and for enabling handling different HO triggers for a SON MRO solution.

RELATED BACKGROUND ART

The following meanings for the abbreviations used in this specification apply:
C-RNTI Cell Radio Network Temporary Identifier
eNB enhanced Node-B
E-UTRA Evolved Universal Terrestrial Radio Access.
GPRS General Packet Radio Service
HetNet Heterogeneous networks
HO Handover
HOF Handover failure
ID Identifier
LTE Long term evolution
LTE-A LTE-Advanced
MLB Mobility load balancing
MRO Mobility robustness optimization
NRT Non real time
QoS Quality of Service
RLF Radio link failure
RNTI Radio network temporary identifier
RRC Radio resource control
RT Real time
SON Self organized network
TS Traffic steering
UE User equipment
UL Uplink Embodiments of the present invention relate to LTE and LTE-A, and in more detail to SON MRO (Mobility Robustness Optimisation) mechanism, which was first developed in Rel.9 LTE system. It was based on RRC re-establishment procedure and inter-eNB notifications: when one eNB detected a re-establishment attempt, it informed about the eNB where the failure happened about this re-establishment attempt. That eNB, based on the information provided in the notification, could discover the reason of the failure (and possibly further notify the eNB where the problem started) based on still available UE context and possibly additional measurements provided from the UE.

In Rel.10 this mechanism was changed: since network information is not always precise (HO command may fail in delivery) and not complete if the UE context is missing (which is the case if the re-establishment fails and the C-RNTI is lost), the Rel.10 MRO solution was based on the information reported from the UE. This is very precise if certain assumptions are made concerning the situations: that all the HOs are triggered only because of radio reasons and the triggering criteria are the same for all the UEs. Those assumptions are needed, because the UE is not aware of the HO process at the eNB and receives only the HO command, therefore can not report back anything that lead to the handover decision in the eNB.

In Rel.11, the MRO-MLB (or MRO—traffic steering, in general) coordination is still considered as a possible focus area. Since activity of MLB may trigger HOs that are not related to radio conditions (actually, usually against radio conditions, which may lead to failures), the assumptions made in Rel.10 may not hold any longer. Also, different criteria may be used in HetNet deployment, where pico cells may be used to handle particular types of UEs and therefore HO triggering to those pico cells may be different than those to other macro cells.

Thus, the Rel.10 MRO solution is based on the UE report, which, while providing detailed radio conditions of the failure, does not tell anything about the triggering condition at the source eNB. If it can be assumed all the HOs are carried out because of radio conditions (mobility) and that all users are treated in the same way (the same trigger point), this could be sufficient. However, in a modern network, in presence of other SON features, this is too general, though.

In the following, two examples for illustrating the problem are described.

Problem Example 1

If the HO trigger point is different for different types of users (differentiation may be based, for example, on mobility type or service class), the information that a given HO failed because it was triggered too late is not sufficient: the network will have to guess which of the trigger points is wrong. That may lead to correcting the one that is actually set well and increasing failure rate even more.

Problem Example 2

If there is any other feature running that may trigger HOs also for non-radio reasons (for example, MLB or traffic steering policies) and such HO leads to a failure, the information about the failure provided later from the UE will trigger an MRO analysis. Eventually, the HO will be treated as a radio-driven one. If corrective action is applied, the setting for radio-driven HOs will be amended and likely their failure rate even increased.

A solution to the above defined problem that would create yet another MRO mechanism is not likely: principles of Rel.10 MRO solution are not considered to be changed in Rel.11.

Hence, summarizing, the SON MRO mechanism defined in Rel.10 is based solely on the information provided from the UE that suffered connection failure. Since the network can not use the UE context, all the information that lead to the HO decision is lost. This may mean the problem that caused the failure can not be corrected, if there are more than one trigger point (handover threshold or cause).

SUMMARY OF THE INVENTION

Embodiments of the present invention address this situation and aim to improve possibilities for analyzing a cause for a connection failure.

According to a first aspect of embodiments of the present invention an apparatus is provided which comprises a transceiver configured to provide a connection with at least one network node, and a processor configured to receive, via the transceiver, information enabling handover and/or apparatus type identification related to a handover and to store the information enabling handover and/or apparatus type identification.

According to a second aspect of embodiments of the present invention an apparatus is provided which comprises a transceiver configured to provide a connection with at least one a user equipment, and a processor configured to carry out a handover related procedure concerning a user equipment, to establish information enabling handover and/or apparatus type identification related to the handover, and to send the information enabling handover and/or apparatus type identification via the transceiver to the user equipment.

According to a third aspect of embodiments of the present invention an apparatus is provided which comprises a transceiver configured to provide a connection to at least another network node, and a processor configured to receive and send inter-node messages related to a failure analysis process, to receive, via the transceiver, a failure indicating message containing the information enabling handover and/or apparatus type identification, and to analyze a cause for the connection failure based on the failure indicating message containing the information enabling handover and/or apparatus type identification.

According to a fourth aspect of embodiments of the present invention a method is provided which comprises receiving, by a user equipment, information enabling handover and/or apparatus type identification related to a handover, and storing the information enabling handover and/or apparatus type identification.

According to a fifth aspect of embodiments of the present invention a method is provided which comprises carrying out a handover related procedure concerning a user equipment, establishing information enabling handover and/or apparatus type identification related to the handover, and sending the information enabling handover and/or apparatus type identification via the transceiver to the user equipment.

According to a sixth aspect of embodiments of the present invention a method is provided which comprises receiving and sending inter-node messages related to a connection failure analysis process, receiving a failure indicating message containing the information enabling handover and/or apparatus type identification, and analyzing a cause for the connection failure based on the failure indicating message containing the information enabling handover and/or apparatus type identification.

Advantageous developments are defined in the dependent claims.

Thus, according to embodiments of the present invention, an apparatus such as a user equipment is provided with information enabling handover and/or apparatus type identification, which can later be used for analyzing the cause for a connection failure.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

Figure 1:
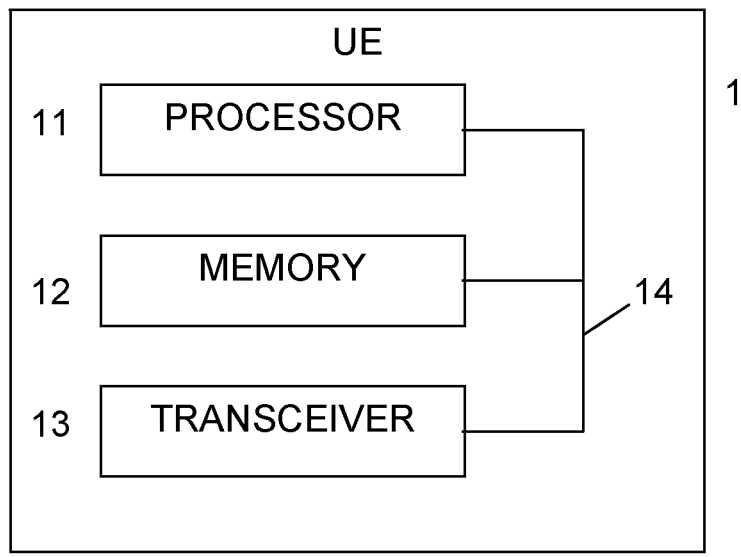
FIG. 1 shows an example for a UE according to an embodiment of the present invention.

FIG. 1 shows an UE 1 as an example for an apparatus (which may be a user equipment or a part thereof) according to a more general embodiment of the present invention. The UE 1 comprises a transceiver 13 configured to provide a connection with at least one network node, and a processor 11 configured to receive, via the transceiver 13, information enabling handover and/or apparatus type identification related to the handover and to store the information enabling handover and/or apparatus type identification.

The UE may also comprise a memory 12 for storing data and programs, by means of which the processor 11 may carry out its corresponding functions, and in which the handover trigger information can be stored.

Figure 2:
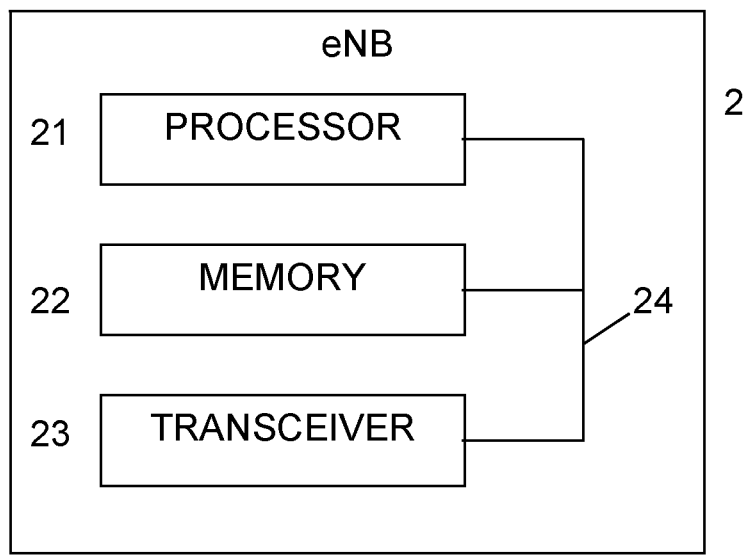
FIG. 2 shows an example for an eNB according to an embodiment of the present invention.

FIG. 2 shows an eNB 2 as an example for an apparatus (which may be a network control element such as a base station or eNB, or a part thereof) according to a more general embodiment of the present invention. The eNB comprises a transceiver 23 configured to provide a connection with at least one a user equipment, and a processor 21 configured to carry out a handover related procedure concerning a user equipment, to establish information enabling handover and/or apparatus type identification related to the handover, and to send the information enabling handover and/or apparatus type identification via the transceiver to the user equipment (e.g., UE 1 shown in FIG. 1).

Similar as the UE 1, also the eNB 2 may comprise a memory 23 for storing data and programs, by means of which the processor 21 may carry out its corresponding functions.

Thus, according to certain embodiments of the present invention, the UE 1 receives information enabling handover and/or apparatus type identification related to the handover from the eNB 2, i.e., the source eNB to which the UE was connected before the handover attempt. In case of a connection failure (e.g., a handover failure or a radio link failure) in the source eNB or target eNB, the information enabling handover and/or apparatus type identification can be sent to the eNB 2 so that reasons for the failure can be evaluated based on the information enabling handover and/or apparatus type identification.

For example, the information enabling handover and/or apparatus type identification may be a handover trigger information which is sent during a handover initiation message such as a HO command (as an example for a handover related message). In case of a failure, the information is returned to the eNB that triggered the erroneous HO. In this way, the handover conditions that might have caused the failure can be identified and evaluated.

Another example for the information enabling handover and/or apparatus type identification is user equipment type information which is sent during a connection reconfiguration message from the controlling eNB to the user equipment. In case of a failure, the information is returned to the eNB. In this way, the failure can be evaluated based on the UE type, for example whether the UE was moving with high speed, whether the UE type carried out non-real time applications or the like.

Hence, according to the above general embodiments of the invention, further information is available to evaluate handover failures and, thus, to enhance robustness of a mobile network.

Figure 3:
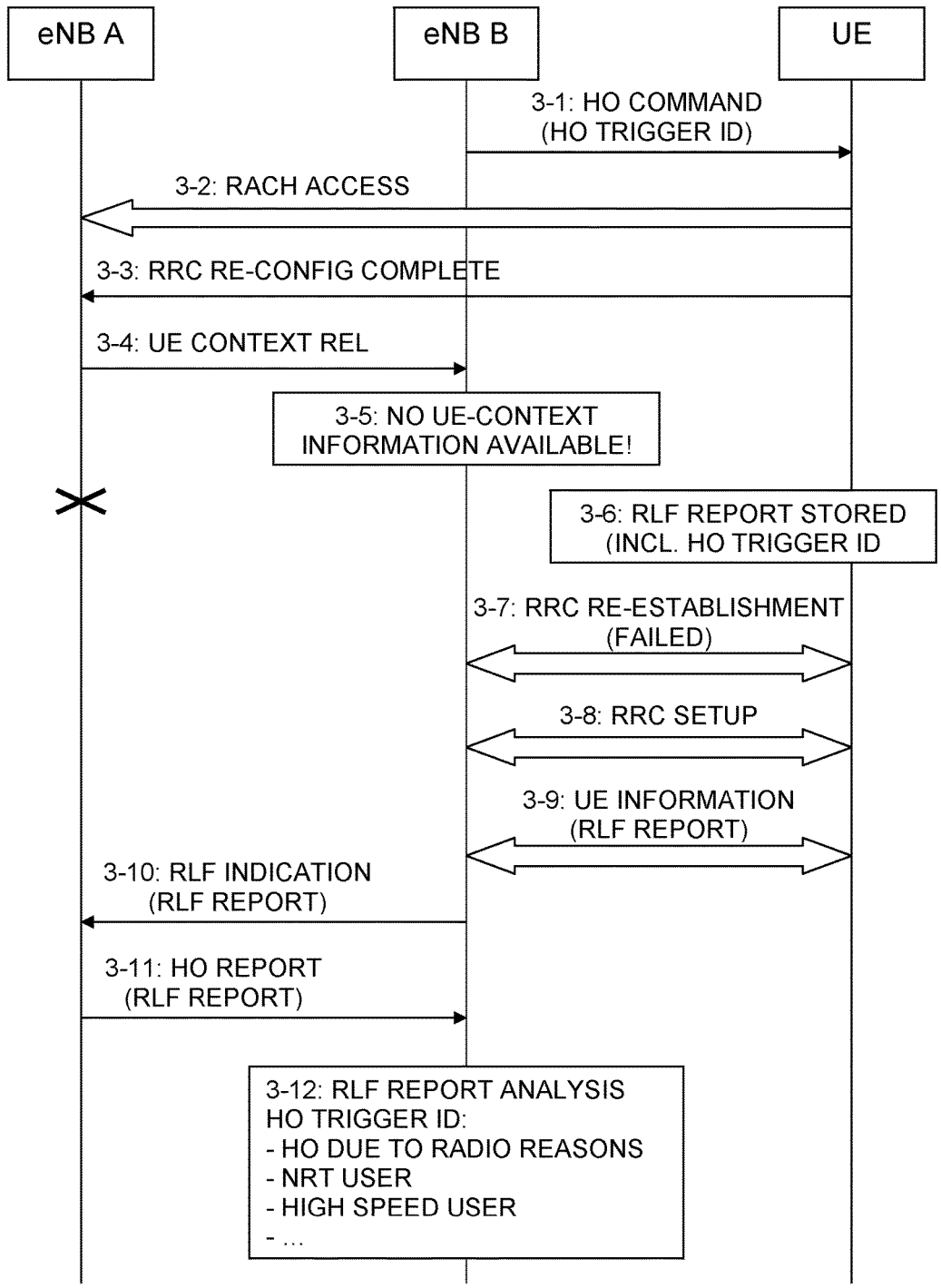
FIG. 3 shows a signaling flow according to an embodiment of the present invention including a HO trigger identifier.
Figure 4:
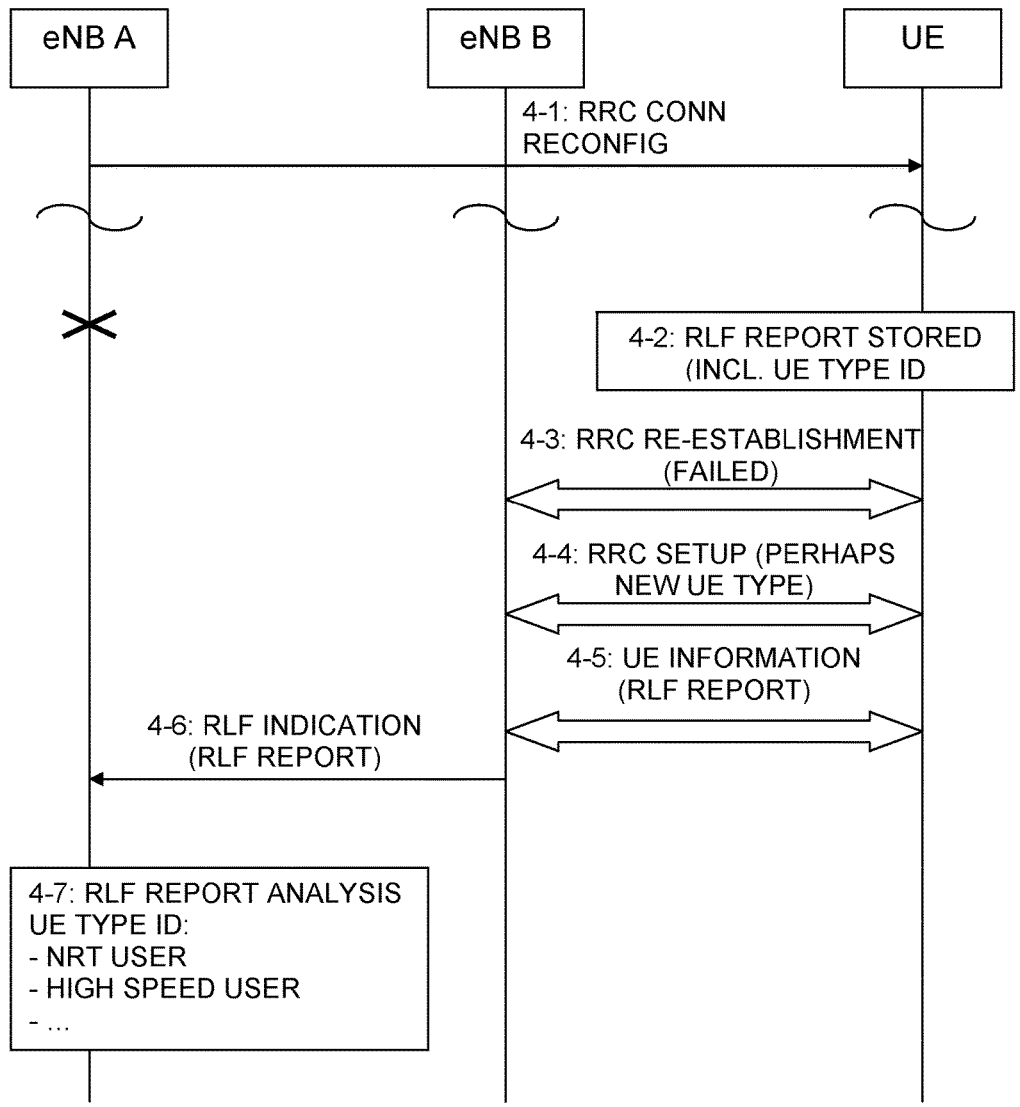
FIG. 4 shows a signaling flow according to an embodiment of the present invention including a UE type identifier.

Detailed embodiments are described in the following by referring to FIGS. 3 and 4, wherein FIG. 3 illustrates an example in which handover trigger information is sent to an UE, and FIG. 4 illustrates an example in which UE type information is set to the UE.

Thus, according to an embodiment as shown in FIG. 3, HO (handover) trigger information are provided to the UE and this is stored in the UE. Then, in case of a connection failure, the eNB can recall the HO trigger conditions based on the information retrieved from the UE.

In detail, the source eNB (e.g., eNB 2 shown in FIG. 2) informs the UE (e.g., UE 1 shown in FIG. 1), when a HO command (as an example for handover initiation message) is sent, about relevant HO trigger conditions (i.e., those conditions which triggered the need for a handover) by means of the HO trigger information. The UE stores the information and reports it back to the network, in case of a failure, as part of or together with the RLF Report (as an example for connection failure related information). An identification of the node (e.g. eNB) where the failure (RLF) occurred can be retrieved from the RLF Report and this node is informed with an RLF Indication message which contains the RLF Report information and this node also performs the failure cause analysis. This eNB, if needed, may then forward it further to the eNB that started the erroneous HO.

The information provided to the UE with the HO command may be "direct", i.e. a detailed list of trigger thresholds, HO cause, QoS class and any other factor that the eNB might take into account when initializing the HO. In this way, detailed information would be easily available when evaluating the reason for the failure.

However, such a list could be rather long, burdensome for the UE to handle and possibly still incomplete, since the HO algorithm is proprietary and therefore it may take into account almost infinite number of factors. Therefore, preferably, an "indirect" information is passed to the UE: the source eNB assigns internally an identifier to a HO triggering condition. This identifier, or a codepoint, in a form of a relatively short number, is passed to every UE that is handed over based on these triggering conditions. If a HO goes wrong, the concerned UE reports the identifier as part of or together with the RLF Report. Then, when the source eNB where the failure occurred or the eNB which started the erroneous HO receives the identifier returned from the UE (forwarded in the RLF INDICATION and possibly in the HO REPORT), it can match it internally to the actual HO trigger. Therefore, the HO cause can be recalled and trigger conditions that were wrong can be identified correctly. It is important to note that this form does not reveal anything about the HO algorithm itself.

The signal flow shown in FIG. 3 is based on the above alternative, namely that the HO trigger information is in the form of an identifier. In this example, it is assumed that a handover failure occurs for example due to a connection failure in the target eNB A (indicated by "X"). That is, FIG. 3 illustrates an example with a "too early HO", in which the HO is triggered to eNB A too early, and even though it succeeds, the connection fails soon thereafter.

In 3-1, the source eNB, indicated as eNB B, sends a HO command to the UE, which includes a HO trigger identifier #2 as mentioned above. In the following HO attempt, the UE performs a RACH access in 3-2, and sends a RRC Re-config complete message in 3-3 to the target eNB, indicated as eNB A. In 3-4, the eNB B sends a UE context release to the eNB A, in order to inform the source eNB about HO success and to release the resources in the source ENB A. Therefore, after this no UE-context information is available at the eNB B, as indicated in 3-5.

Now, it is assumed that the connection fails in eNB A. Hence, the UE creates and stores a RLF report, including the HO trigger identifier #2, in 3-6. After this, the UE tries to re-connect to the source eNB B by performing a RRC re-establishment (with the indication of a failure) in 3-7 and performing RRC setup in 3-8. In 3-9, UE information including the RLF report established by the UE in 3-6 is exchanged. The RLF report is sent to the last serving eNB A in a RLF indication message in 3-10. Thereafter, the eNB A performs the failure cause analysis and, after detecting the first HO from eNB B was erroneous, it sends a HO report including the RLF report to the eNB B in 3-11, so that thereafter a RLF report analysis can be carried out in 3-12. In particular, it is checked to which HO condition the HO trigger identifier #2 is mapped, for example whether the HO was due to radio reasons, or due to non-real time user or high speed user.

The HO trigger identifier as mentioned above could be used only if the UE received the HO command. Therefore, it would not be reported in case of too late HO, as then the UE does not receive the command. In order to enable differentiation of the UE type (e.g. fast UEs may need to be triggered sooner than slow ones; NRT UEs may be excluded from MRO resolution, because connection failure is less problematic in their case), another identifier may be introduced: UE type identifier. This one may be assigned with RRC reconfiguration, stored in the RLF report in case of a failure and reported after reconnection. It is important to store the UE type in the RLF report right after the failure in order to avoid overriding it with a new classification when the UE reconnects after the failure to another cell.

FIG. 4 shows an example for a signaling flow in this case. Again, it is assumed that a handover is carried out between eNB B as source eNB to eNB A as target eNB, wherein again it is assumed that connection failure occurs for example due to a connection failure in the target eNB A (indicated by "X"). That is, FIG. 4 illustrates an example with a "too late HO".

In this case, in 4-1, the eNB A sends a RRC connection reconfiguration message in 4-1 to the UE. The RRC connection reconfiguration (RRC Conn Reconfig) message includes the above reference user type identifier (UE type id). If then the handover failure occurs, the UE creates and stores a RLF report, including the user type identifier, in 4-2. 4-3 to 4-6 are similar to 3-7 to 3-10 of FIG. 3. That is, the UE re-connects to another eNB B by effecting RRC re-establishment in 4-3 and an RRC setup in 4-4, and in 4-5 UE information including the RLF report is forwarded to the eNB B. The eNB B sends a an RLF indication in 4-6 to eNB A, and in 4-7, the RLF report is analyzed. That is, in particular the UE type identifier is evaluated, so that the failure can be evaluated based on the kind of the UE, i.e., whether it is a NRT UE, a fast moving UE or the like, as mentioned above.

It is noted that the HO trigger identifier and the UE type identifier are independent from each other: their usage in the MRO algorithm may be adapted, depending if only one or both together are used. For example, if only the HO trigger identifier is used, in the eNB implementation, different UE types may be assigned different HO trigger IDs. However, if the UE type identifier is used, then this id may cover UE type, while the HO trigger identifier may correspond to the HO cause only.

In the following, a general embodiment of an apparatus involved in analyzing the connection failure is described by referring to FIG. 5.

Figure 5:
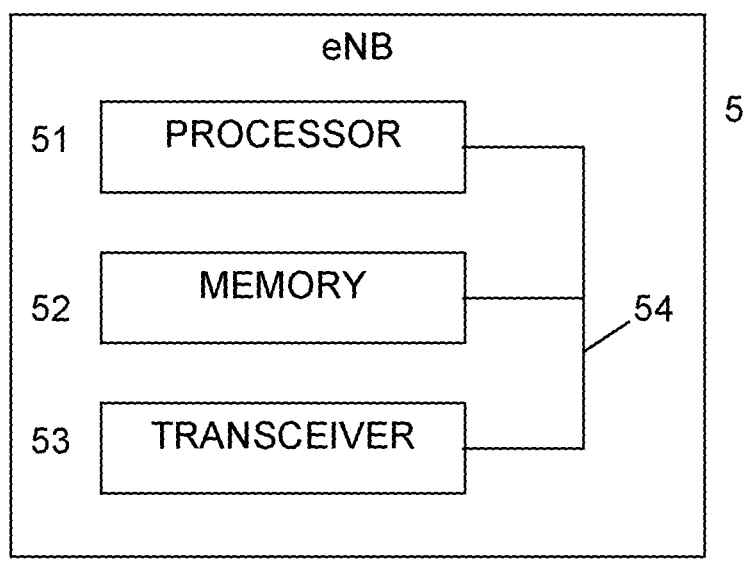
FIG. 5 shows an example for an eNB for carrying out an analysis of a connection failure according to an embodiment of the present invention.

FIG. 5 shows an eNB 5 as an example for such an apparatus (which may be a network control element such as a base station or eNB, or a part thereof), and in particular as an example for eNB A and/or eNB B shown in FIG. 3 and FIG. 4. The eNB comprises a transceiver 53 to provide a connection to at least another network node, and a processor 21 which is configured to receive and send inter-node messages related to a failure analysis process, to receive, via the transceiver, a failure indicating message containing the information enabling handover and/or apparatus type identification, and to analyze a cause for the connection failure based on the failure indicating message containing the information enabling handover and/or apparatus type identification.

An example for the above eNB is eNB B shown in FIG. 3, wherein the analysis is carried out in 3-12, or eNB A shown in FIG. 4, wherein the analysis is carried out in 4-7.

However, the analysis also includes a check that the cause for the connection failure lies not in the present eNB. Hence, the processor 51 may be further configured to send the information enabling handover and/or apparatus type identification to the node controlling the cell where the connection failure started.

An example for this function is sending the RLF indication in 3-10 shown in FIG. 3, or in 4-6 shown in FIG. 4.

Similar as the eNB 2 shown in FIG. 2, also the eNB 5 may comprise a memory 53 for storing data and programs, by means of which the processor 51 may carry out its corresponding functions.

For an actual implementation of the above embodiments, following changes in the RRC signaling could be considered:

1) The information about the HO trigger point and/or UE type is passed to the UE. This can be done as a new IE with the RRC setup/reconfiguration message, with or without MobilityInfo. Since the information concerns the HO, the option "RRC Reconfiguration with MobilityInfo" seems the most logical. In that case, the added IE contains a certain identifier or codepoint, as described above. If the codepoint option is decided, the additional field can be of limited length.

2) In case of RLF (or HOF), the UE stores this identifier or the codepoint, for example as information element of the RLF report.

3) The identifier or the codepoint, likely as a part of the RLF Report, is provided when the UE reconnects to an eNB. This report is then transparently forwarded to the eNB where the failure happened, so changes in X2AP RLF INDICATION are not needed. If needed, the report may then be forwarded further in the X2AP HO REPORT.

Thus, summarizing, according to embodiments of the present invention, a method is provided to map the conditions under which a connection failure occurred (e.g. HO cause, trigger conditions QoS combination and further more) to a failure event reported by UE. Providing this HO trigger to the UE helps it provide better information back to the network.

That is, when a handover is triggered, the source eNB generates a "HO trigger ID" for the set of conditions that triggered the handover. The "HO trigger ID" is sent to the UE in handover related signaling, and stored in the RLF Report if the UE subsequently experiences connection failure. If the RLF Report is later retrieved by the network and passed to the source eNB, the "HO trigger ID" can be considered (along with other information) by the SON MRO algorithm for determining the cause of the connection failure and what actions to take.

In addition or alternatively, a "UE type ID" could be signaled to the UE for the set of "non-HO related" characteristics of the UE which may be useful in SON MRO analysis. Similar to "HO trigger ID", it is stored by the UE in the RLF Report if the UE subsequently experiences connection failure.

Thus, according to certain embodiments, just a single short value is passed to the UE, as a IE, and then it is reported it back in case of a handover failure. The UE is informed about the ID of the handover trigger, which is later found when the UE reports back the ID.

According to the embodiment described above, it is proposed to give the UE a code point or ID (e.g. 8 bit) which is then included in the RLF report and from that the node where the RLF happened the failure can be uniquely categorized.

It is noted that the above embodiments of the present invention basically follow the Rel10 approach which is based on information hold in UE (in contrast to Rel9 which is based on UE context hold in the network). Rel10 is more flexible in terms that it does rely on context storage within the network, i.e. UE can provide RLF reports after days and problem can still be analyzed. Cell changes are not only triggered by mobility and even if they are mobility triggered, failures are more or less critical depending on service type, etc.

In the Rel10 philosophy the network does not remember anything. There is no unique UE ID, like C-RNTI, recalled after the UE passes to idle and then reconnects. So the base stations cannot remember, hence, any kind of information which might be of interest for MRO must be conveyed by the UE.

There are several reasons for going that way. Main reason was that there might be cases where the RLF reports are not sent immediately, but up to 48 hours after the RLF (e.g., when the UE stays in a 3G network in the meantime which does not support RLF report). A temporal identifier such as C-RNTI could not be blocked that long.

Hence, according to embodiments of the present invention, the UE and/or the HO triggering conditions are marked (e.g., whether it is real time/non-real time (RT/NRT), this HO is due to traffic steering (TS)/radio conditions, the UE is in a specific location (street1/street2), etc.). In case of a failure, this marking goes to the network, and finally back to the cell which has caused the failure. And then it can "remember", i.e. it can react appropriately. For example, it can ignore all failures from NRT users, if they are seen as less burdensome for the users. Alternatively thresholds may be changed only for certain UEs, (e.g., only for users in a certain location, e.g. on particular street (street1)). Moreover, also it would be possible to not change mobility thresholds if the RLF was caused by TS.

Thus, according to embodiments of the present invention, an improved way of analyzing handover failures is provided.

It is noted that the embodiments and the present invention in general is not limited to the specific examples given above.

For example, the information enabling handover and/or apparatus type identification is not limited to handover trigger information and UE type only, and also other suitable information for evaluating a handover failure can be used.

According to the above-described embodiments, the information enabling handover and/or apparatus type identification (e.g., HO trigger and/or UE type identifier) are sent, in case of a re-connection of the UE after recovery from the failure, within the RLF report (as an example for connection failure related information), as shown by 3-9 in FIG. 3 and by 4-5 in FIG. 4, and are forwarded to the last serving eNB in this RLF report. However, the invention and the embodiments are not limited to this. That is, the information enabling handover and/or apparatus type identification may be sent as a separate information element (IE), or may also be included in another suitable message. Moreover, the information enabling handover and/or apparatus type identification may also be sent as part of the handover (HO) report.

Moreover, the embodiments described above are related to LTE and LTE-A. However, the embodiments and the invention are also applicable to other network structures, as long as it is possible to send corresponding information in handover related message to a UE and to store it there.

Hence, according to embodiments of the present invention, apparatuses and methods are provided by which a user equipment receives information enabling handover and/or apparatus type identification related to a handover, and stores the information enabling handover and/or apparatus type identification. In case of a connection failure, the stored information enabling handover and/or apparatus type identification may later be used to evaluate the cause for the connection failure.

According to a further aspect of embodiments of the present invention an apparatus is provided which comprises
means for receiving, by a user equipment or a part thereof, information enabling handover and/or apparatus type identification related to a handover, and
means for storing the information enabling handover and/or apparatus type identification.

According to a still further aspect of embodiments of the present invention an apparatus is provided which comprises
means for carrying out a handover related procedure concerning a user equipment,
means for establishing information enabling handover and/or apparatus type identification related to the handover, and
means for sending the information enabling handover and/or apparatus type identification via the transceiver to the user equipment.

According to another aspect of embodiments of the present invention a method is provided which comprises
means for receiving and sending inter-node messages related to a connection failure analysis process,
means for receiving a failure indicating message containing the information enabling handover and/or apparatus type identification, and
means for analyzing a cause for the connection failure based on the failure indicating message containing the information enabling handover and/or apparatus type identification.

It is to be understood that any of the above modifications can be applied singly or in combination to the respective aspects and/or embodiments to which they refer, unless they are explicitly stated as excluding alternatives.

For the purpose of the present invention as described herein above, it should be noted that method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. A user equipment comprising
a transceiver configured to provide a connection with at least a source base station, and
a processor configured to receive from the source base station, via the transceiver, mobility information comprising an identifier of one or more conditions that trigger a handover of the user equipment from the source base station and to store the mobility information;
the processor further configured to detect a connection failure associated with a triggered handover from the source base station to a destination base station and, in response to the connection failure being detected, to provide the mobility information including the identifier to the source base station via the transceiver upon re-connecting after the connection failure.

2. The user equipment according to claim 1, wherein the mobility information is received by the user equipment in a handover initiation message for initiating the handover.

3. The user equipment according to claim 1, wherein the transceiver is configured to send user equipment type information to the at least one source base station in a connection reconfiguration message.

4. A first radio network node comprising:
a transceiver configured to provide a connection to at least a second radio network node, and
a processor configured to receive and send inter-node messages related to a failure analysis process,
the processor of the first radio network node configured to receive from the second radio network node, via the transceiver, a failure indicating message containing mobility information comprising an identifier of one or more conditions that triggered a handover of a user equipment from the first radio network node to the second radio network node, where the handover resulted in a connection failure by the user equipment to the second radio network node, and
the processor further configured to analyze a cause for the connection failure based at least on the received mobility information,
where neither the first nor the second radio network node is a user equipment.

5. The first radio network node according to claim 4, wherein the processor is configured to analyze the cause for the connection failure further based on user equipment type information that the first radio network node received from the user equipment in a connection reconfiguration message.

6. The method of claim 5, wherein the user equipment type information comprises mobility type of the user equipment.

7. The method of claim 5, wherein the user equipment type information comprises service class of the user equipment.

8. The method of claim 5, wherein the mobility information comprises handover trigger information.

9. The first radio network node according to claim 4, wherein the mobility information identifies the conditions that triggered the handover via a handover information identifier being one of a plurality of information identifiers configured for different handover conditions.

10. The first radio network node according to claim 9, wherein the failure indicating message further comprises a user equipment type identifier being one of a plurality of user equipment type identifiers configured for different kinds of user equipments.

11. A method comprising
receiving, by a user equipment from a source base station, mobility information that comprising an identifier of one or more conditions that trigger a handover of the user equipment from the source base station,
storing the mobility information;
detecting a connection failure associated with a triggered handover from the source base station to a destination base station and, in response to the connection failure being detected, the user equipment providing the mobility information including the identifier to the source base station upon re-connecting after the connection failure.

12. The method according to claim 11, wherein the mobility information is received in a handover initiation message for initiating the handover.

13. The method according to claim 11, the method further comprising:
the user equipment sending user equipment type information to the source base station in a connection reconfiguration message.

14. A method for operating a first radio network node, the method comprising:
receiving and sending inter-node messages related to a connection failure analysis process,
receiving at the first radio network node from a second radio network node a failure indicating message containing mobility information comprising an identifier of one or more conditions that triggered a handover of a user equipment from the first radio network node to the second radio network node, where the handover resulted in a connection failure by the user equipment to the second radio network node, and
analyzing at the first radio network node a cause for the connection failure based on at least the mobility information;
where neither the first nor the second radio network node is a user equipment.

15. The method according to claim 14, the method further comprising:
the first radio network node analyzing the cause for the connection failure further based on user equipment type information received from the user equipment in a connection reconfiguration message.

16. The method according to claim 14, wherein the mobility information identifies the conditions that triggered the handover via a handover information identifier being one of a plurality of information identifiers configured for different handover conditions.

17. The method according to claim 16, wherein the failure indicating message further comprises a user equipment type identifier being one of a plurality of user equipment type identifiers configured for different kinds of user equipments.

18. The method according to claim 14, wherein:
the method further comprises sending, prior to receiving at the first radio network the failure indicating message, a message from the first radio network node to the second radio network node, the message comprising the mobility information,
the receiving at the first radio network node from the second radio network node the failure indicating message contains the mobility information and indicates the connection failure by the user equipment to the second radio network node.

19. The method according to claim 18, wherein:
the mobility information identifies conditions that triggered the handover via a handover information identifier being one of a plurality of information identifiers configured for different handover conditions,
the method further comprises matching the handover information identifier with an actual handover trigger, and
analyzing at the first radio network node the cause for the connection failure based on at least the mobility information uses the actual handover trigger.

20. A non-transitory computer readable memory tangibly storing a computer program that when run on at least one processor causes a device to perform a method according to claim 14.

* * * * *